US010240986B2

(12) United States Patent
Shaw et al.

(10) Patent No.: US 10,240,986 B2
(45) Date of Patent: *Mar. 26, 2019

(54) THERMOGRAPHIC TEMPERATURE SENSOR

(71) Applicant: General Electric Company, Schenectady, NY (US)

(72) Inventors: Donald W. Shaw, Simpsonville, SC (US); Andrew David Ellis, Greenville, SC (US); David Beshears, Knoxville, TN (US); Duane Weldon Dinkel, Greenville, SC (US); Jason Ryan Henderson, Taylors, SC (US); Stephen W. Allison, Collierville, TN (US)

(73) Assignee: General Electric Company, Schenectady, NY (US)

( * ) Notice: Subject to any disclaimer, the term of this patent is extended or adjusted under 35 U.S.C. 154(b) by 153 days.

This patent is subject to a terminal disclaimer.

(21) Appl. No.: 15/279,075

(22) Filed: Sep. 28, 2016

(65) Prior Publication Data

US 2018/0087974 A1 Mar. 29, 2018

(51) Int. Cl.
*G01K 11/20* (2006.01)
*G01K 1/08* (2006.01)
*G01M 15/10* (2006.01)
*G01K 11/32* (2006.01)
*G01K 13/02* (2006.01)

(52) U.S. Cl.
CPC ............. *G01K 11/20* (2013.01); *G01K 1/08* (2013.01); *G01K 11/3213* (2013.01); *G01K 13/02* (2013.01); *G01M 15/102* (2013.01)

(58) Field of Classification Search
None
See application file for complete search history.

(56) References Cited

U.S. PATENT DOCUMENTS

| 4,075,493 A * | 2/1978 | Wickersheim | G01J 5/08 356/44 |
| 2006/0067379 A1 * | 3/2006 | Djeu | G01K 3/00 374/161 |
| 2007/0171958 A1 * | 7/2007 | Hoang | G01J 1/58 374/161 |
| 2008/0117951 A1 * | 5/2008 | Djeu | G01K 7/42 374/159 |

(Continued)

OTHER PUBLICATIONS

Extended European Search Report and Opinion issued in connection with corresponding EP Application No. 17192352.7 dated Dec. 1, 2017.

*Primary Examiner* — Andre Allen
(74) *Attorney, Agent, or Firm* — Fletcher Yoder, P.C.

(57) ABSTRACT

A system includes a thermographic temperature sensor that may measure a temperature of a fluid. The thermographic temperature sensor includes a probe, an optical source coupled to the probe, and a detector coupled to the probe. The system also includes a housing of the probe; and a light pipe of the probe disposed within the housing and including a thermographic phosphor that may phosphoresce in response to absorbing light from the optical source. The phosphorescence by the thermographic phosphor is representative of a temperature of the fluid within a flow path of the fluid, and the detector may detect the phosphorescence by the thermographic phosphor.

20 Claims, 10 Drawing Sheets

(56) References Cited

U.S. PATENT DOCUMENTS

2014/0269817 A1    9/2014    Hockaday
2015/0113942 A1    4/2015    Hockaday
2018/0087975 A1*  3/2018    Ellis ........................ G01K 1/08

* cited by examiner

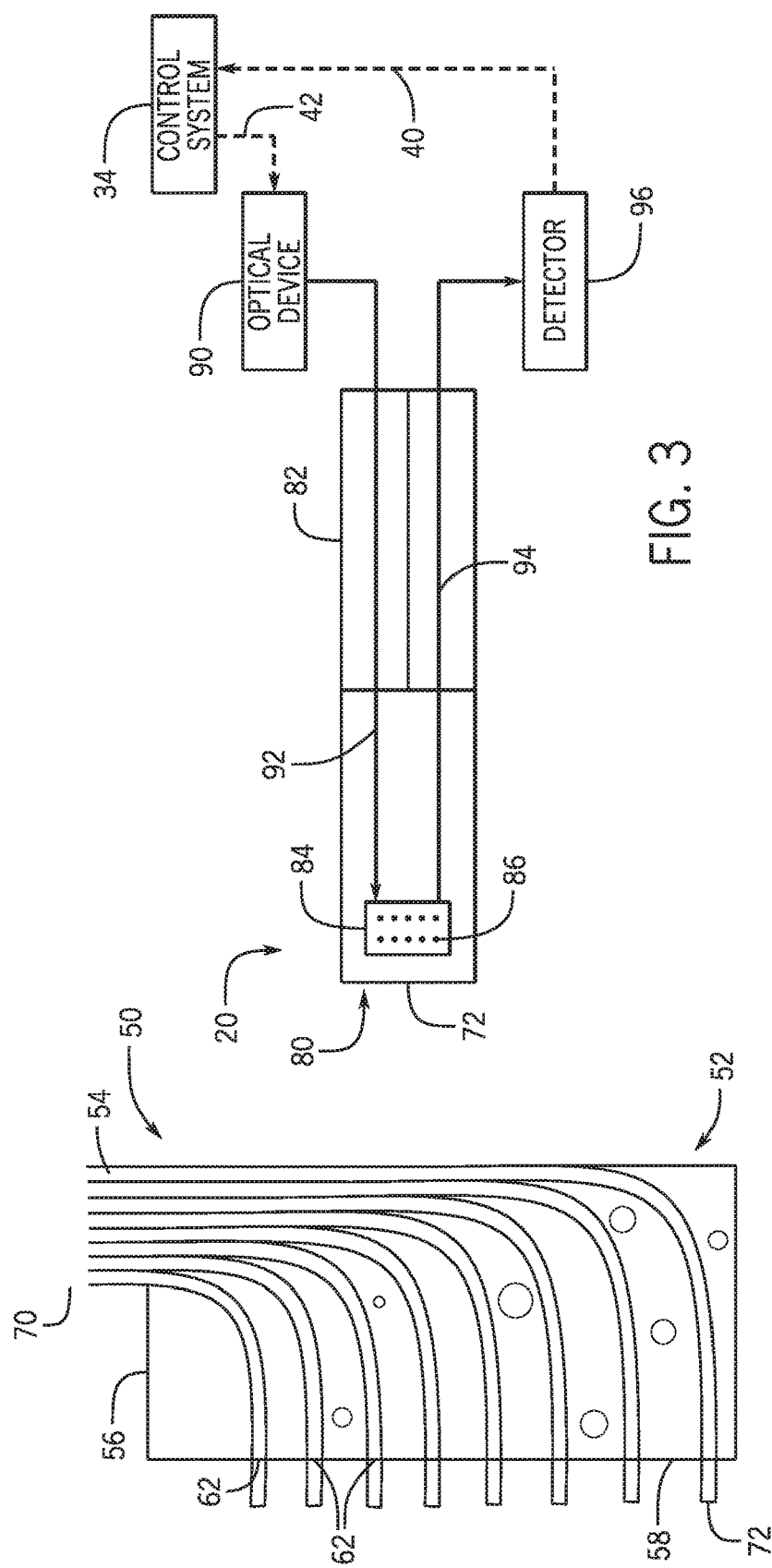

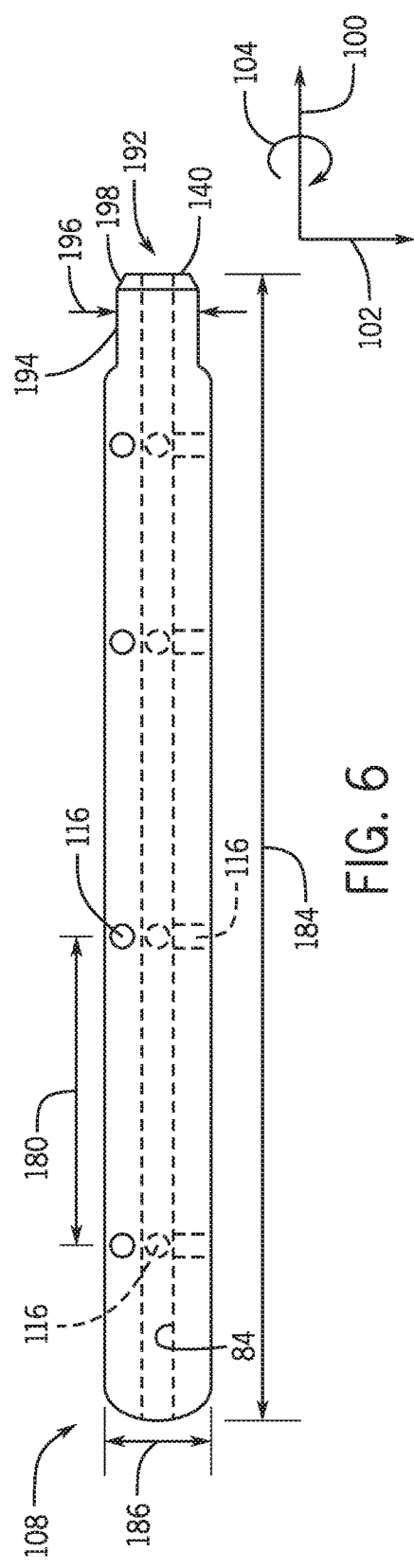
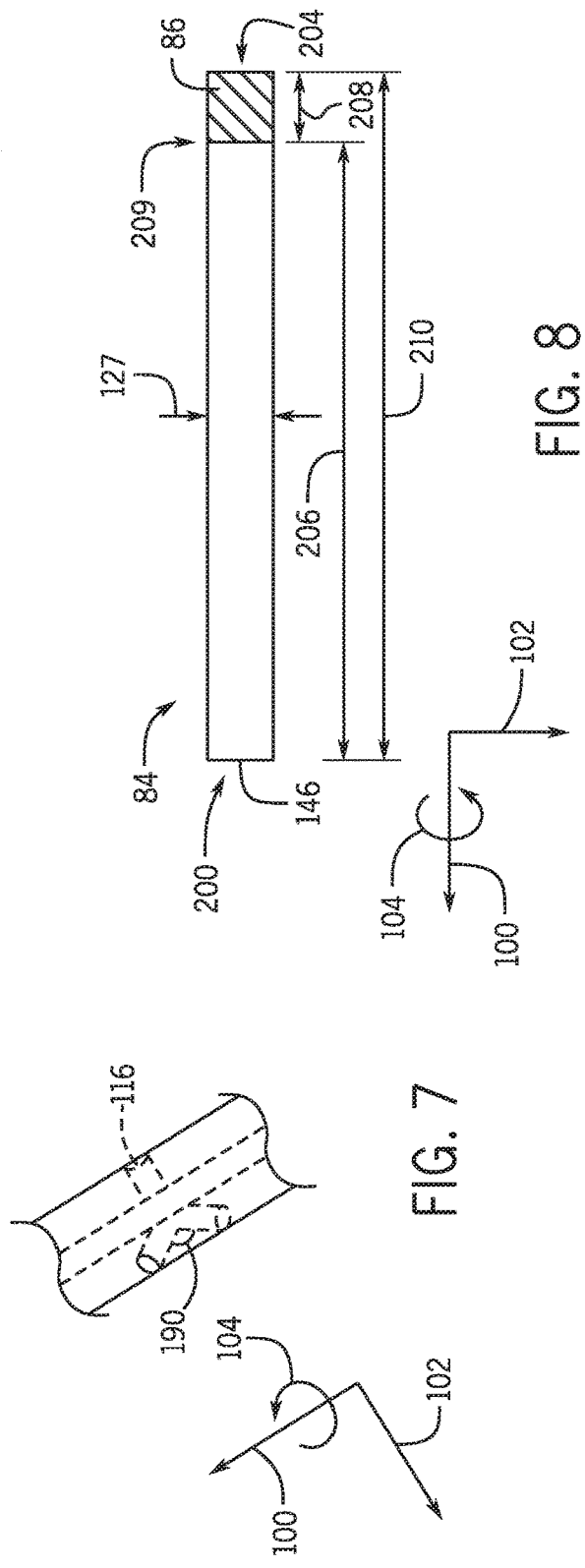
FIG. 6
FIG. 7
FIG. 8

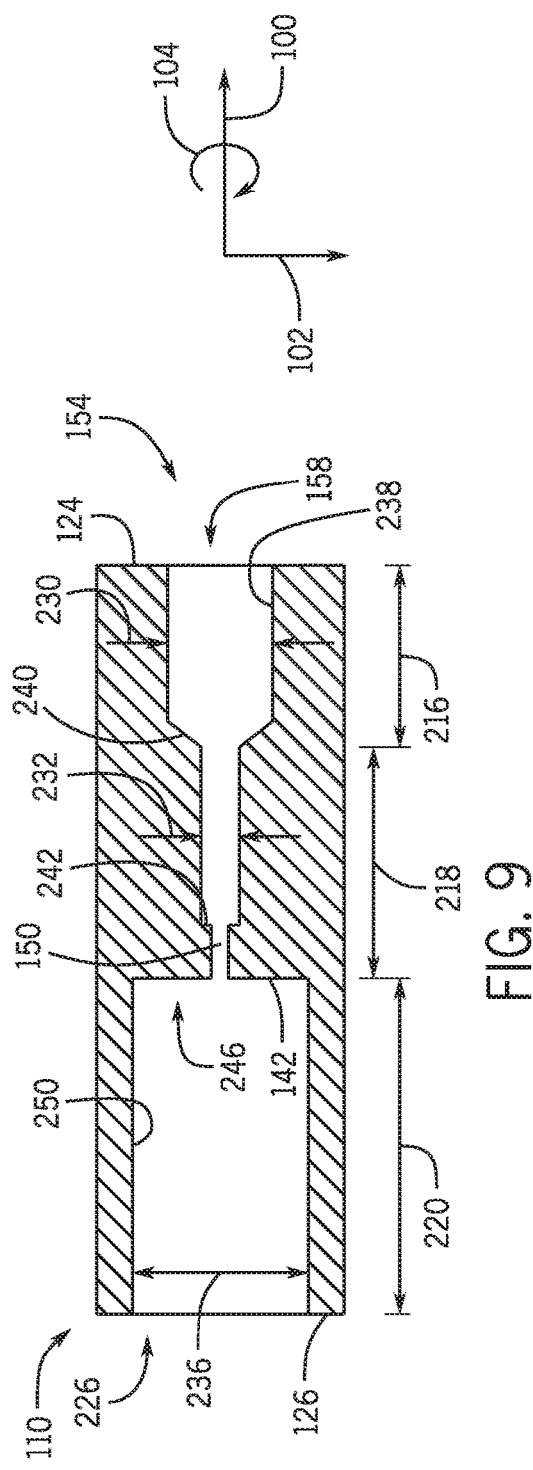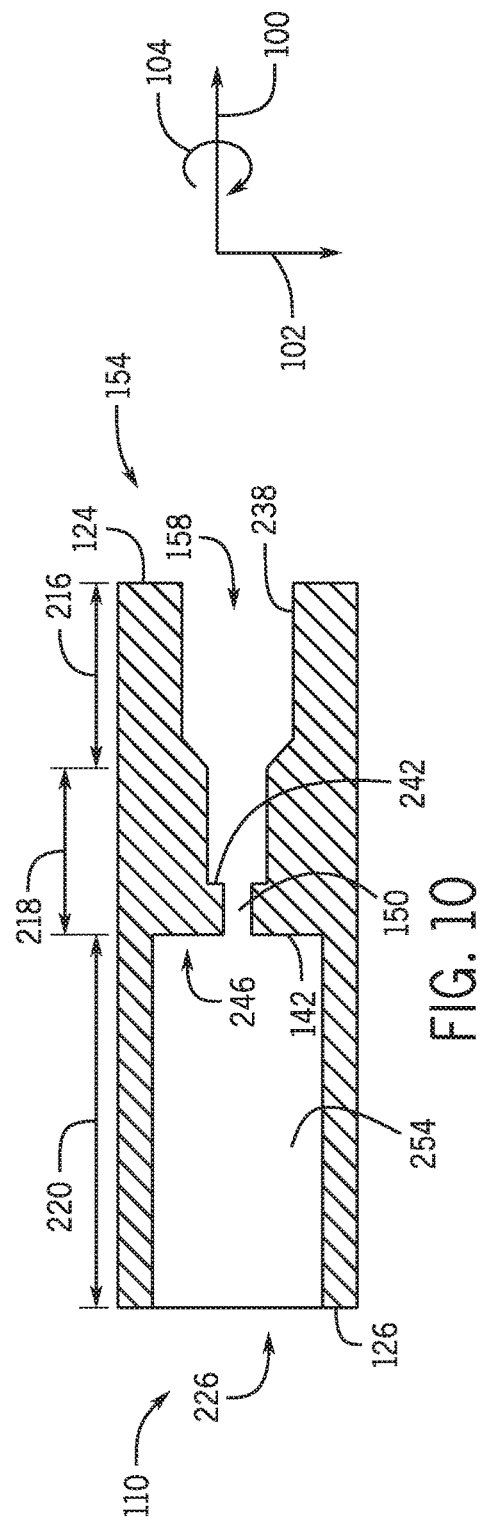

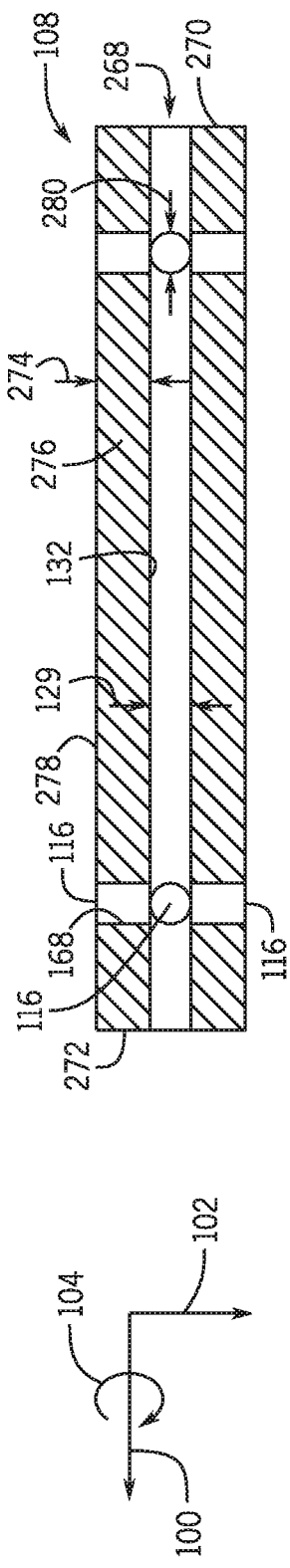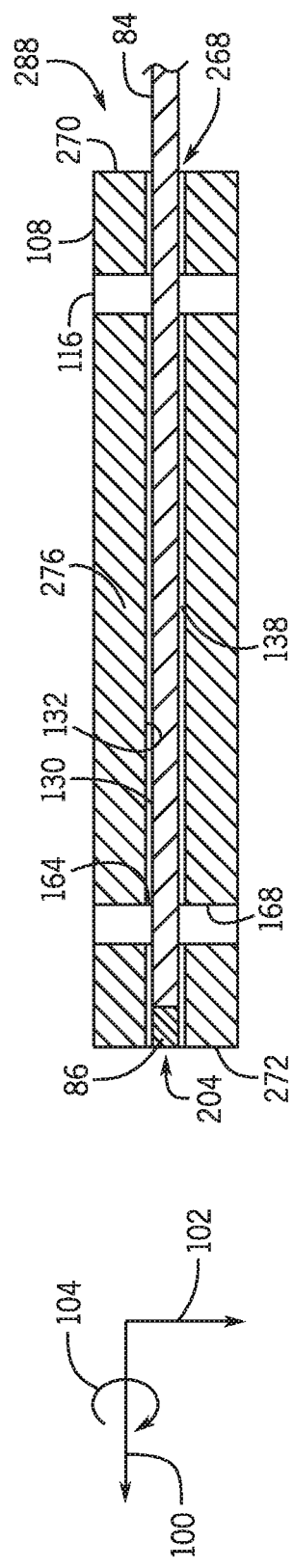

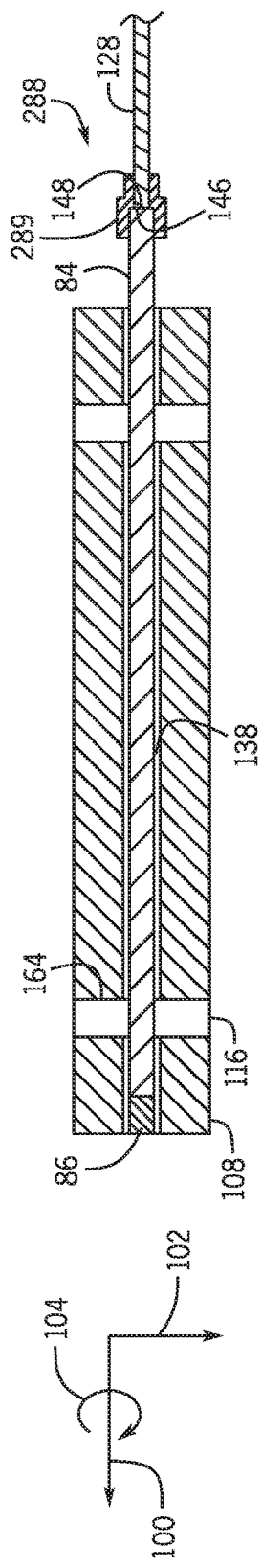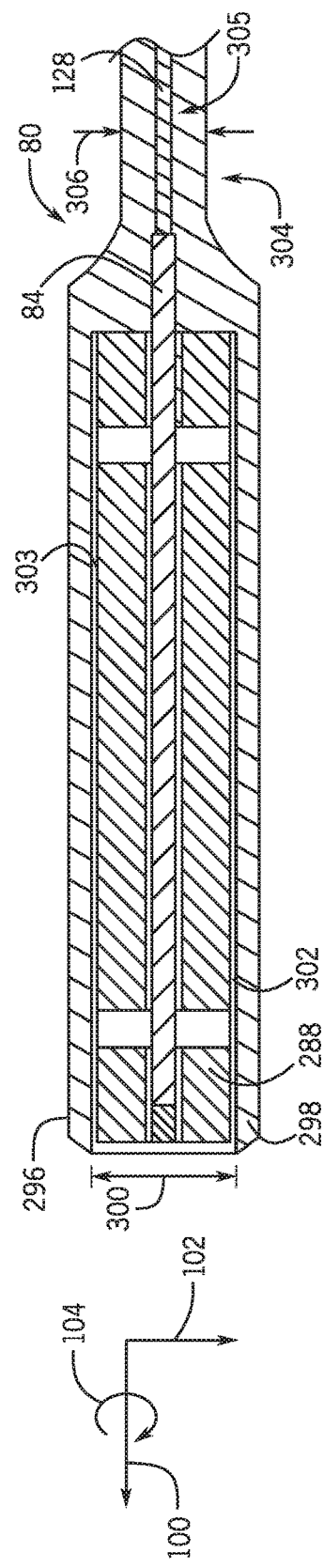

THERMOGRAPHIC TEMPERATURE SENSOR

BACKGROUND OF THE INVENTION

The subject matter disclosed herein relates to, to thermographic temperature sensors, in particular to a thermographic temperature probe for use in high temperature environments.

Gas turbine systems typically include at least one gas turbine engine having a compressor, a combustor, and a turbine. The combustor is configured to combust a mixture of fuel and compressed air to generate hot combustion gases, which, in turn, drive blades of the turbine. A temperature of exhaust gas produced by the gas turbine engine may vary depending on a configuration of the gas turbine engine, the fuel, and/or fuel-to-air ratios, among other combustion parameters. In certain applications, the temperature of the exhaust gas may be estimated, or may be measured using thermocouples. The temperature of the exhaust gas may be at temperature ranges that may be difficult to measure using existing temperature measurement techniques (e.g., applications). Therefore, it may be desirable to improve existing temperature measurement techniques for determining exhaust gas temperatures.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system includes a thermographic temperature sensor that may measure a temperature of a fluid. The thermographic temperature sensor includes a probe, an optical source coupled to the probe, and a detector coupled to the probe. The system also includes a housing of the probe; and a sensing element of the probe disposed within the housing and including a thermographic phosphor that may phosphoresce in response to absorbing light from the optical source. The phosphorescence by the thermographic phosphor is representative of a temperature of the fluid within a flow path of the fluid, and the detector may detect the phosphorescence by the thermographic phosphor.

In a second embodiment, a system includes a gas turbine engine including a combustor that may receive a fuel and air to generate an exhaust gas and a thermographic temperature sensor including a sensor assembly disposed within a flow path of the exhaust gas. The sensor assembly includes a housing that may contact the exhaust gas and a sensing element enclosed within the housing and including a thermographic phosphor that may phosphoresce in response to absorbing light. The phosphorescence by the thermographic phosphor is representative of a temperature of the exhaust gas within the flow path.

In a third embodiment, a method of measuring a temperature of a fluid includes directing light from an optical source to a probe that may contact the fluid and having a housing and a sensing element disposed within the housing, generating phosphorescence from a thermographic phosphor of the sensing element in response to absorbing the light, directing the phosphorescence from the sensing element to a detector coupled to the probe, and determining the temperature of the fluid based on a change in intensity of the phosphorescence over time.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 2 is a schematic diagram of a temperature sensor manifold having a plurality of channels sized to receive one or more of the thermographic temperature sensors and to position the one or more thermographic temperature sensors along an exhaust gas flow path of the gas turbine system of FIG. 1, in accordance with an embodiment of the present disclosure;

FIG. 3 is a schematic diagram of the thermographic temperature sensor of FIG. 1 having a thermographic temperature probe having a housing that encloses a sensing element coupled to an optical source and a detector, in accordance with an embodiment of the present disclosure;

FIG. 6 is a diagram of a sensor sheath that forms part of the housing of the thermographic temperature probe of FIG. 4, the sensor sheath having a plurality of holes spaced apart along its longitudinal axis, in accordance with an embodiment of the present disclosure;

FIG. 7 is a perspective view of a portion of the sensing sheath of FIG. 6 having the plurality of holes spaced apart along its circumferential direction, in accordance with an embodiment of the present disclosure;

FIG. 8 is a diagram of the sensing element of FIG. 5 sized to fit within the housing of the thermographic temperature probe and having a thermographic phosphor disposed at an end of the sensing element, in accordance with an embodiment of the present disclosure;

FIG. 9 is a cross-sectional view of a transition member that forms part of the housing of the thermographic temperature probe of FIG. 4, the transition member having a central passage with a variable inner diameter and a threaded inner surface at one end, in accordance with an embodiment of the present disclosure;

FIG. 10 is a cross-sectional view of a transition member that forms part of the housing of the thermographic temperature probe of FIG. 4, the transition member having a central passage with a variable inner diameter and a threaded inner surface at first and second ends of the transition member, in accordance with an embodiment of the present disclosure;

FIG. 12 is a cross-sectional view of a sheath member having a plurality of channels spaced apart along a longitudinal axis and a circumferential direction of the sheath member and a central bore resulting from one or more steps of the method of FIG. 11, in accordance with an embodiment of the present disclosure;

FIG. 13 is a cross-sectional view of a sensor assembly having the sheath member of FIG. 12 and a thermographic light pipe secured to the sheath member via a plurality of radial supports resulting from one or more steps of the method of FIG. 11, in accordance with an embodiment of the present disclosure;

FIG. 15 is a cross-sectional view of the sensor assembly of FIG. 13 having fiber optic cabling attached to an end face of the thermographic light pipe resulting from one or more steps of the method of FIG. 11, in accordance with an embodiment of the present disclosure; and FIG. 16 is a cross-sectional view of a thermographic temperature probe having the sensor assembly of FIG. 15 disposed within a sleeve, as provided via one or more steps of the method of FIG. 11, in accordance with an embodiment of the present disclosure.

DETAILED DESCRIPTION OF THE INVENTION

Figure 1:
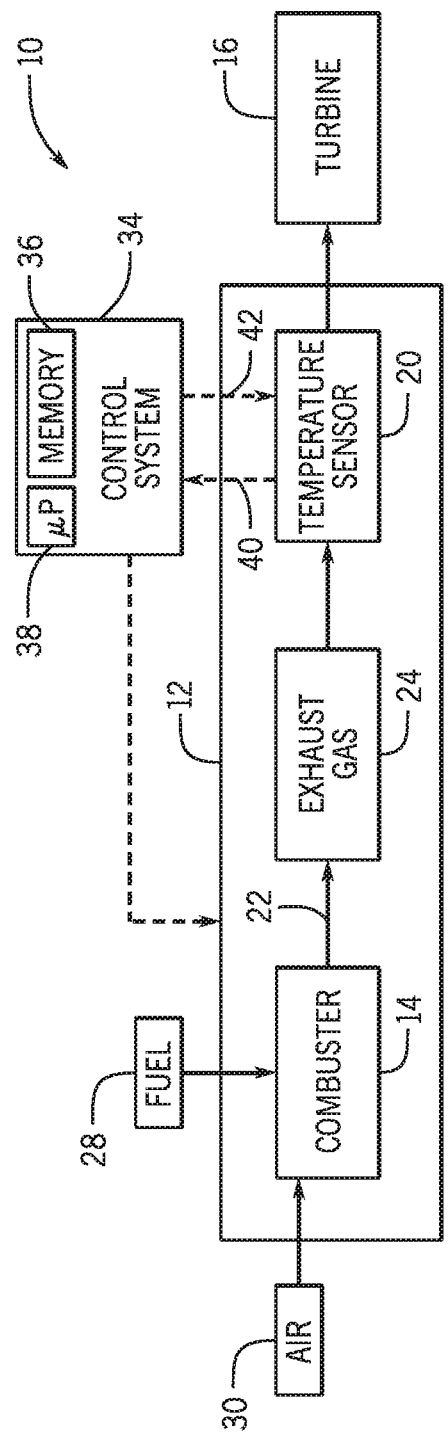
FIG. 1 is a block diagram of a gas turbine system including a thermographic temperature sensor that measures a temperature of an exhaust gas generated in the gas turbine system, in accordance with an embodiment of the present disclosure.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Present embodiments are generally directed toward system and methods for measuring fluid temperatures (e.g., exhaust gas temperature). For example, in gas turbine systems, one or more gas turbine engines may combust a fuel/oxidant mixture to produce combustion gases (e.g., exhaust gases) for driving one or more turbine stages, each having a plurality of blades. Depending on a number of factors, such as the type of fuel that is combusted as well as various combustion parameters (e.g., fuel and/or air flow, pressure, etc.) and gas turbine engine configurations, a temperature of the exhaust gas resulting from the combustion process may vary. Evaluating a temperature of the exhaust gas generated by various gas turbine engine configurations and operating (e.g., combustion) parameters may facilitate design of system components downstream of a combustor of the gas turbine engine. Additionally, in existing gas turbine engines, it may be desirable to monitor the exhaust gas temperatures to monitor combustion parameters of the gas turbine system.

It is now recognized that direct measurement of the temperature of the exhaust gas produced in the gas turbine engine during combustion, also allows for a more direct evaluation of operational parameters of the gas turbine system when adjusted. In addition, other operating parameters may be adjusted in response to these direct temperature measurements. For example, an amount of cooling fluid (e.g., air) used to cool system components downstream of the gas turbine engine may be adjusted and/or redirected to other system components based on such temperature measurements. Also, certain gas turbine engine models may generate an exhaust gas having a temperature that may not require a substantial amount of cooling fluid to cool the exhaust gas and/or downstream system components (e.g., system components downstream of a combustor of the gas turbine engine) in contact with the exhaust gas. Therefore, an amount of air generally used to cool the exhaust gas and/or downstream system components downstream of the combustor may be decreased compared to gas turbine engines that generate exhaust gases having temperatures above a desired threshold. Accordingly, at least a portion of the air used to cool the exhaust gas and/or system components downstream of the combustor may be redirected to the combustor of the gas turbine engine or other system processes that may utilized the air. Moreover, knowing the temperature of the exhaust gas exiting the gas turbine engine may facilitate selection of materials used to fabricate the system components downstream of the gas turbine engine.

In some configurations, exhaust gas temperatures may be evaluated in a combustion testing laboratory using a combustion testing apparatus that is representative of an engine configuration associated with a particular gas turbine engine model. The combustion testing apparatus may simulate performance of the gas turbine engine model that may be incorporated into a particular gas turbine system. One way of measuring exhaust gas temperatures in the combustion testing apparatus is with a thermocouple. For example, Type B thermocouples may be used with the combustion testing apparatus to directly measure the temperature of the exhaust gas exiting a combustor of the combustion testing apparatus. Thermocouples, such as Type B thermocouples, are manufactured from metallic materials such as a mixture of platinum (Pt) and rhodium (Rh). Type B thermocouples are suitable for measuring fluid temperatures up to approximately 1700° C., which is the highest temperature limit for thermocouples. However, certain large frame heavy duty gas turbine engines having a megawatt range greater than 50 megawatts (MW) (e.g., non-Areo derivative gas turbine engines) may generate exhaust gas having temperatures in excess of 1700° C. As such, during combustion testing of large frame heavy duty gas turbine engines, the thermocouples used to measure the exhaust gas temperature in the combustion testing apparatus are generally replaced after a single use, thereby increasing the overall cost of combustion testing. The measurements using these thermocouples may also be inaccurate at such temperatures. In accordance with present embodiments, it is now recognized that temperature sensors that use thermographic materials (e.g., rare-earth- or transition metal-doped ceramic phosphors, also known as thermographic phosphors) may be used to replace thermocouples for high temperature measurement applications. The thermographic temperature sensors may include non-metallic refractory materials (e.g., ceramics) that may be more appropriate for use in temperature sensing applications that are unsuitable for thermocouples.

Thermographic phosphors may have a temperature threshold that is above 1700° C. Therefore, using thermographic temperature sensors for measuring exhaust gas temperatures in the combustion testing apparatus or any other high temperature environment may mitigate the undesirable costs associated with replacement of thermocouples used to measure high temperature fluids (e.g., exhaust gas) after each use. Additionally, the thermographic temperature sensors may provide a more accurate temperature measurement compared to traditional thermocouples at temperatures above 1700° C. Generally, thermographic phosphors are coated onto surfaces of interest to indirectly measure a temperature of a fluid (e.g., exhaust gas) based on the temperature of the surface that is in contact with the fluid. However, depending on the thermal properties (e.g., thermal conductivity) of the surface, the temperature of the surface may not be representative of the fluid that is in contact with the surface. Therefore, it may be desirable to fabricate a thermographic temperature sensor that may be immersed within a fluid of interest to directly measure the temperature of the fluid of interest (e.g., exhaust gas). Accordingly, present embodiments include a thermographic temperature probe that may be used to directly measure the temperature of fluids of interest, even when the temperature of the fluid is greater than the suitable temperature range for traditional thermocouples.

With the foregoing in mind, FIG. 1 is a schematic diagram of an example gas turbine system 10 that includes a gas turbine engine 12 having a combustor 14 and a turbine 16. In certain embodiments, the gas turbine system 10 may be all or part of a power generation system. In other embodiments, the gas turbine system 10 may be part of a laboratory combustion testing apparatus. The gas turbine system 10 also includes one or more thermographic temperature sensors 20 positioned along a flow path 22 of an exhaust gas 24 generated in the combustor 14. For example, in the illustrated embodiment, the one or more thermographic temperature sensors 20 are located between the combustor 14 and the turbine 16. However, in other embodiments, the one or more thermographic temperature sensors 20 may be located downstream of the turbine 16 or at any other suitable location within the gas turbine system 10.

In operation, the gas turbine system 10 may use liquid or gas fuel, such as natural gas and/or a hydrogen-rich synthetic gas, to run the gas turbine system 10. As shown in FIG. 1, fuel 28 and air 30 (e.g., compressed air) enter the combustor 14. For example, one or more fuel nozzles may inject a fuel-air mixture into the combustor 14 in a suitable ratio for desired combustion, emissions, fuel consumption, power output, and so forth. The combustion of the fuel 28 and the air 30 may generate the hot pressurized exhaust gas 24 (e.g., combustion gases), which may then be utilized to drive one or more turbine blades within the turbine 16. For example, in operation, the combustion gases (e.g., the exhaust gas 24) flowing into and through the turbine 16 may flow against and between the turbine blades, thereby driving the turbine blades and, thus, a shaft of the gas turbine engine 12 into rotation to drive a load, such as an electrical generator in a power plant. In embodiments where the system 10 is a testing apparatus, the turbine 16 may not necessarily be in place.

The one or more thermographic temperature sensors 20 may be used to measure the temperature of the exhaust gas 24 within the gas turbine system 10. For example, the one or more thermographic temperature sensors 20 may measure the temperature of the exhaust gas 24 within or immediately downstream of the combustor 14, upstream of the turbine 16 (e.g., between the combustor 14 and the turbine 16), downstream of the turbine 16 (e.g., in an exhaust duct), or any other suitable location within the gas turbine system 10. Depending on the configuration of the gas turbine engine 12 and/or the fuel used in the gas turbine system 10, the temperature of the exhaust gas 24 may be above a temperature (e.g., 1700° C.) suitable for using existing thermocouples. For example, certain large frame heavy duty gas turbine engines may generate exhaust gases having temperatures above 1700° C. (e.g., between approximately X and Y° C.). As discussed above, thermocouples are generally used to measure the temperature of the exhaust gas generated in combustion systems (e.g., the gas turbine system 10, combustion testing apparatus, etc.). However, Type B thermocouples, which have the highest temperature tolerance compared to other types of thermocouples, are not suitable for measuring temperatures of fluids (e.g., the exhaust gas 24) that are above 1700° C. Additionally, the metallic materials used to manufacture thermocouples may not be sufficiently durable to withstand fluid temperatures exceeding 1700° C. Thermographic phosphor-based temperature sensors of the present disclosure may be manufactured from non-metallic refractory materials that may be more durable and/or resistant to fluid temperatures above 1700° C. compared to the metal-based thermocouple temperature sensors.

The present disclosure uses a thermographic phosphor disposed within a temperature probe that may be inserted into a flow path of the fluid of interest. In this way, the thermographic phosphor may be used to directly measure the temperature of the fluid of interest rather than the temperature of the surface that may be exposed to the fluid. Accordingly, the one or more thermographic temperature sensors 20 may include a temperature probe having thermographic phosphors such as rare-earth- or transition metal-doped crystals that may be used to directly measure the temperature of the exhaust gas 24. As discussed in further detail below with reference to FIG. 3, the thermographic phosphors may be excited with optical energy, resulting in phosphorescence of the thermographic phosphors. Certain characteristics of the phosphorescence may be a function of the temperature of the fluid. Thus, in accordance with certain embodiments, the phosphorescence of the thermographic phosphors may be measured over time to determine the temperature of the exhaust gas 24.

The illustrated gas turbine system 10 also includes a control system 34 configured to control operation of the gas turbine system 10 and/or determine the temperature of the exhaust gas 24 based on the temperature measurements obtained from the one or more temperature sensors 20. The control system 34 may independently control operation of the gas turbine system 10 by electrically communicating with sensors, control valves, and pumps, or other flow adjusting features throughout the gas turbine system 10. The control system 34 may include a distributed control system (DCS) or any computer-based workstation that is fully or partially automated. For example, the control system 34 can be any device employing a general purpose computer or an application-specific device, both of which may generally include memory circuitry 36 storing one or more instructions for controlling operation of the gas turbine system 10, determining combustion parameters, and determining a temperature of the exhaust gas 24, among others. The memory 36 may store algorithms used to determine the temperature of the exhaust gas 24 based on phosphorescence characteristics of the thermographic phosphor in the one or more temperature sensors 20. The processor may include one or more processing devices (e.g., microprocessor 38), and the memory circuitry 36 may include one or more tangible, non-transitory, machine-readable media collectively storing instructions executable by the processor to control actions described herein.

In certain embodiments, the control system 34 may include separate controllers for controlling the gas turbine engine 12 and the temperature sensor 20. In one embodiment, the temperature sensor 20 includes its own controller. For example, a temperature controller may be disposed within a housing of the temperature sensor 20. The temperature controller may communicate with the control system 34 to control operational parameters of the gas turbine system 10 based on the temperature of the exhaust gas 24.

Additionally or alternatively, the control system 34 of the gas turbine system 10 may perform functions such as notifying the operators of the system 10 to adjust operating parameters, perform service, or otherwise cease operating the system 10. In some embodiments, the control system 34 may also implement corrective actions specifically relating to adjusting fuel/air ratios, exhaust temperature, flow rates of cooling air, or any other suitable parameter of the gas turbine system 10.

In certain embodiments, the control system 34 may use information provided via one or more input signals 40 from one or more sensors (e.g., the temperature sensor 20) of the gas turbine system 10 to execute instructions or code contained on the memory 36 and generate one or more output signals 42 to various flow control devices to control a flow of fluids (e.g., the fuel 28 and the air 30) within the gas turbine system 10. In one embodiment, the control system 34 may control operation of optical components of the one or more temperature sensors 20 to determine the temperature of the exhaust gas 24, as discussed in further detail below with reference to FIG. 3.

The one or more thermographic temperature sensors 20 may measure the temperature of the exhaust gas 24 in the gas turbine system 10 within or downstream of the combustor 14 (e.g., along a flow path of the exhaust gas 24 between the combustor 14 and the turbine 16). In certain embodiments, the gas turbine system 10 may include a manifold that may facilitate placement of the one or more temperature sensors 20 along (within) the flow path of the exhaust gas 24. For example, FIG. 2 illustrates a temperature manifold 50 (e.g., a temperature rake) that may be used in the gas turbine system 10 to facilitate direct measurement of the temperature of the exhaust gas 24 with the one or more thermographic sensors 20. The temperature manifold 50 includes a body 52 having a plurality of channels 54 sized to accommodate the one or more temperature sensors 20. Each channel of the plurality of channels 54 extends from a manifold end 56 toward a manifold sidewall 58, and terminates in an opening 62 on the manifold sidewall 58. The openings 62 may be disposed at progressively increasing distances away from the manifold end 56. In use, each sensor of the one or more thermographic temperature sensors 20 may be inserted into a port 70 of the respective channel of the plurality of channels 54 disposed adjacent to the manifold end 56. The channel of the plurality of channels 54 may guide the one or more thermographic temperature sensors 20 through the temperature manifold 50 and through the opening 62. A tip 72 of the one or more temperature sensors 20 may extend a distance away from the sidewall 58 and into the flow path of the exhaust gas 24 (e.g., an exhaust flow path upstream of the turbine 16). In this way, the one or more temperature sensors 20 may directly measure the temperature of the exhaust gas 24 in the gas turbine system 10.

FIG. 3 illustrates an embodiment of the one or more temperature sensors 20 that may be used to measure the temperature of the exhaust gas 24 in the gas turbine system 10. Again, the temperature sensor 20 may be suitable for measuring temperatures of a wide variety of fluids especially those expected to have a temperature above ranges that are generally appropriate for traditional thermocouples. In the illustrated embodiment, the temperature sensor 20 includes a probe 80 having a housing 82 that encloses a light pipe 84 and certain other components of the one or more temperature sensors 20 (e.g., waveguide). The light pipe 84 includes a base material (e.g., non-doped yttrium aluminum garnet (YAG) crystal, sapphire crystal, quartz crystal, zirconia fibers) and a thermographic phosphor 86 (e.g., a sensing element) that may emit a certain intensity of light depending on the temperature of the exhaust gas 24 or other fluid of interest. For example, the one or more thermographic temperature sensors 20 may include an optical source 90 (e.g., an ultraviolet (UV) lamp, laser, light emitting diode (LED)) that, when activated, emits light 92 toward the light pipe 84. In response to the emitted light 92, the thermographic phosphor 86 in the light pipe 84 luminesces and emits light 94. A detector 96 receives the emitted light 94 from the thermographic phosphor 86 and transmits an output signal of the one or more output signals 40 to the control system 34. In certain embodiments, the probe 80 includes a controller separate from the control system 34 that processes the signal from the emitted light 94 to determine a temperature of the exhaust gas 24, and outputs the temperature of the exhaust gas 24 to the control system 34. For example, the controller may be disposed within a housing of the probe 80. The control system 34 may control operational parameters of the gas turbine system 10 based on the temperature of the exhaust gas 24. Additionally, the optical source 90 and the detector 96 may be disposed within the housing of the probe 80 such that the probe 80 may be portable.

The control system 34 may send an input signal of the one or more input signals 42 to the optical source 90, thereby activating the optical source 90 to emit the light 92 for a desired period of time (e.g., between approximately 1 nanosecond (ns) and 10 ns). Once the detector 96 detects the light 94 emitted by the thermographic phosphor 86, the detector 96 may send the output signal of the one or more output signals 40 to the control system 34 indicating that the thermographic phosphor 86 absorbed the light 92 emitted by the optical source 90 and is emitting the light 94 in response to the light 92 from the optical source 90. Following detection of the light 94, the control system 34 may send another input signal of the one or more input signals 42 to the optical source 90 to deactivate the optical source 90. The thermographic phosphor 86 continues to phosphoresce (e.g., emit the light 94) for a period of time after deactivation of the optical source 90. A characteristic of the phosphorescence of the thermographic phosphor 86 as a function of time may be used to determine the temperature of a fluid (e.g., the exhaust gas 24). For example, the intensity of the light 94 emitted by the thermographic phosphor 86 steadily decreases over time (e.g., decays). The decay (or lifetime) of phosphorescence of the thermographic phosphor 86 is a function of the temperature of the exhaust gas 24 (or any other fluid of interest). Accordingly, the control system 34 may determine the decay of phosphorescence (e.g., a decrease in the intensity of the light 94 over time) of the thermographic phosphor 86 to determine the temperature of the exhaust gas 24. In certain embodiments, the thermographic phosphor 86 may emit multiple wavelengths. Therefore, a ratio between two wavelengths of interest may be used to determine the temperature of the exhaust gas 24.

Figure 4:
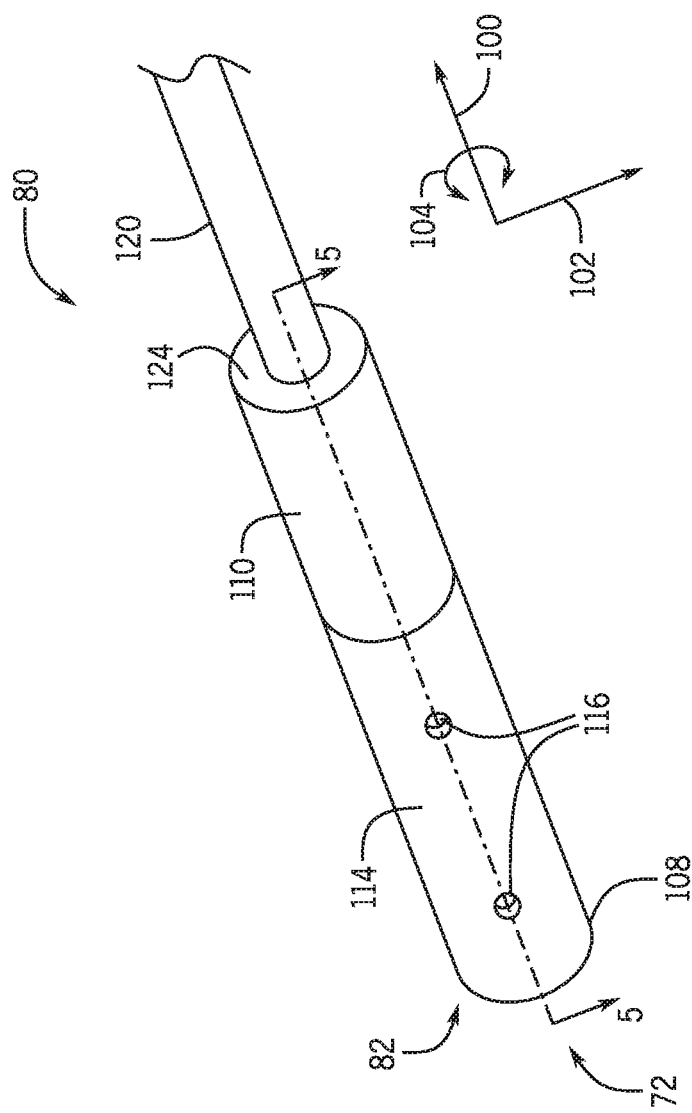
FIG. 4 is a perspective view of the thermographic temperature probe of FIG. 3 having a housing including a sheath member and a transition member, in accordance with an embodiment of the present disclosure.

As discussed above, the thermographic phosphor 86 is enclosed within the housing 82 of the probe 80 associated with the one or more thermographic temperature sensors 20. The probe 80 may be positioned along the flow path of the exhaust gas 24 (or any other fluid of interest) such that the thermographic phosphor 86 in the light pipe 84 may directly measure the temperature of the exhaust gas 24. FIG. 4 illustrates an embodiment of the probe 80 of the one or more thermographic temperature sensors 20 that may be used to measure the temperature of a fluid of interest, such as the exhaust gas 24 generated in the gas turbine system 10. The probe 80 may have an axial axis or direction 100, a radial axis or direction 102 away from axis 100, and a circumferential axis or direction 104 around axis 100. In the illustrated embodiment, the housing 82 of the probe 80 includes a sheath member 108 and a transition member 110. The sheath member 108 forms part of an exterior surface 114 of the probe 80, and includes a plurality of holes 116 along the axial and circumferential directions 100, 104, respectively. In certain embodiments, a sensor head (e.g., sleeve) may be disposed circumferentially around at least a portion of the sheath member 108, as discussed below with reference to FIG. 16.

The probe 80 disclosed herein is suitable for use in high-temperature environments (e.g., environments having temperatures above 1700° C.). For example, the probe 80 may be used to measure temperatures between approximately 1500° C. and approximately 2500° C. However, the probe 80 may also measure temperatures below 1500° C., similar to thermocouples. As an example, some or all of the components of the probe 80 may be manufactured from non-metallic materials that are durable at temperatures up to approximately 2500° C. For example, the sheath member 108, the transition member 110, or both, may be manufactured from refractory materials (e.g., ceramic) including, but not limited to, oxides (e.g., aluminum oxide, calcium oxide), silica, magnesia, carbides (e.g., silicon carbide, tungsten carbide), zirconia, graphite, boron nitride, corrosion-resistant metal alloy (e.g., HASTELLOY®) or any other suitable high temperature material. In certain embodiments, the transition member 110 is manufactured from materials having a low coefficient of thermal expansion (e.g., between approximately 3 and 6). For example, the transition member 110 may be manufactured from materials such as, but not limited to, tungsten or vanadium.

The sheath member 108 encloses (e.g., circumferentially surrounds) one or more components of the probe 80. For example, the sheath member 108 may encapsulate the light pipe 84 and at least a portion of the waveguide (e.g., fiber optic cabling) used to facilitate transmission of signals (e.g., the light 92, 94) to and from the light pipe 84. The transition member 110 is positioned between the sheath member 108 and tubing 120 that houses the fiber optic cabling. The tubing 120 extends axially away from a proximal surface 124 of the transition member 110 that is opposite the tip 72 of the probe 80. A proximal end of the tubing 120 (e.g., a tube end furthest away from the transition member 110) may terminate in a connector configured to couple the probe 80 to the optical source 90 and the detector 96. As discussed in further detail below, the transition member 110 may facilitate alignment of the fiber optic cabling and the light pipe 84 such that the fiber optic cabling may direct and receive the light 92, 94, respectively, to and from the light pipe 84. Additionally, in certain embodiments, the transition member 110 may create an air gap between the light pipe 84 and the fiber optic cabling, which may facilitate distribution of the light 92 before the light 92 impinges on the light pipe 84, as discussed in further detail below. The fiber optic cabling may be a single fiber that receives and transmits the light 92, 94 through the probe 80. However, in one embodiment, the fiber optic cabling may include dedicated fiber optic cable for receiving and transmitting the light 92 from the optical source 90 to the light pipe 84 and a dedicated fiber optic cable for receiving and transmitting the light 94 from the thermographic phosphor 86 to the detector 96.

Figure 5:
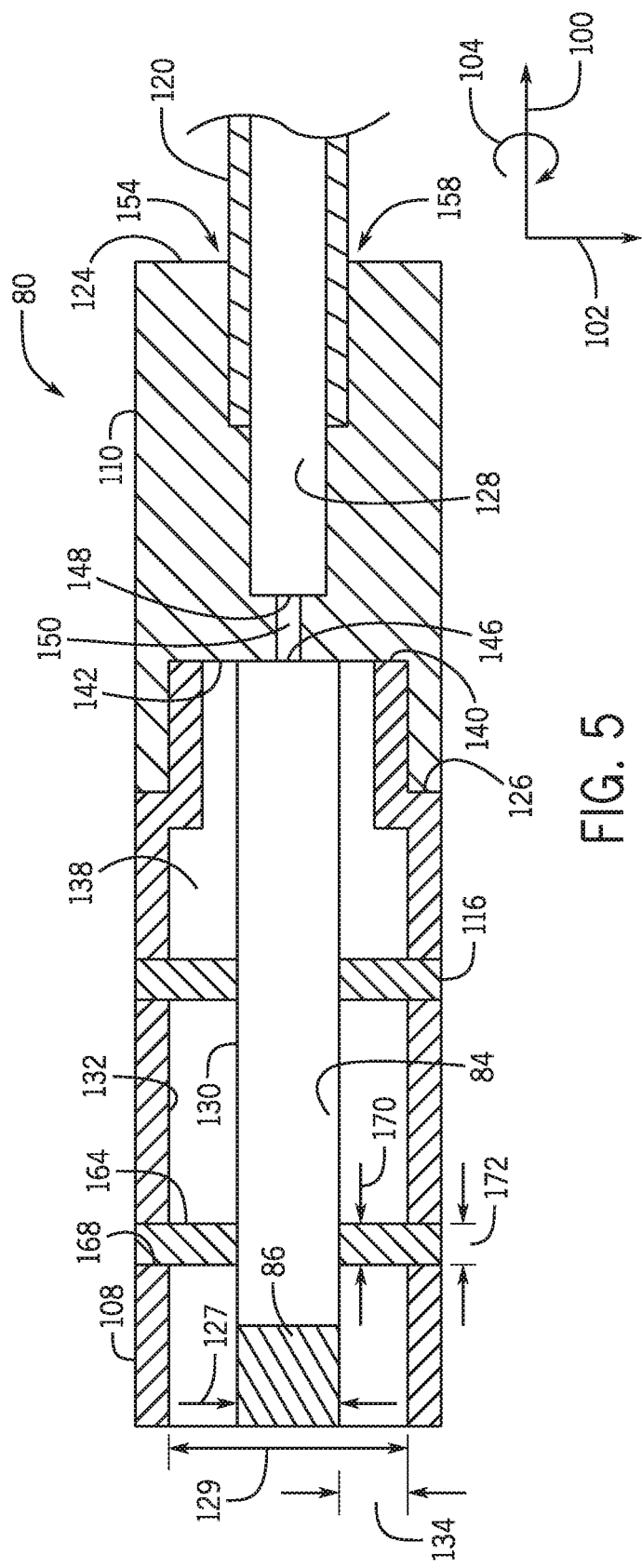
FIG. 5 is a cross-sectional view of the thermographic temperature probe of FIG. 4 including a sensing element having a thermographic phosphor enclosed within the housing of the thermographic temperature probe such that an annulus is formed between the housing and the sensing element, in accordance with an embodiment of the present disclosure.

FIG. 5 illustrates a cross-sectional view of an embodiment of the probe 80. As discussed above, the sheath member 108 and the transition member 110 circumferentially surround the light pipe 84 and a waveguide (e.g., fiber optic cabling 128), respectively. The fiber optic cabling 128 transmits the light 92 emitted by the optical source 90 to the thermographic phosphor 86 in the light pipe 84. Additionally, as discussed above, the fiber optic cabling 128 receives the light 94 emitted by the thermographic phosphor 86 and transmits the light 94 to the detector 96. Accordingly, it may be desirable to surround the light pipe 84 with air (e.g., air cladding, air gap) to efficiently transmit light to the thermographic phosphor 86. The air around the light pipe 84 may facilitate guiding the light 92, 94 through the light pipe 84, thereby improving signal strength.

In the illustrated embodiment, the light pipe 84 has an outer diameter 127 that is smaller than a first inner diameter 129 of the sheath member 108. For example, the outer diameter 127 may be between approximately 5% and approximately 80% less than the inner diameter 129 of the sheath member 108. As such, an outer wall 130 of the light pipe 84 may be positioned radially 102 away from an inner wall 132 of the sheath member 108 by a distance 134, thereby forming a first annulus 138 between the outer wall 130 of the light pipe 84 and the inner wall 132 of the sheath member 108. The first annulus 138 may be filled with air or any other suitable gas to facilitate guiding transmission of the light 92, 94 through the light pipe 84.

A portion of the sheath member 108 may be disposed within the transition member 110 such that a sheath end face 140 abuts a first inner surface 142 of the transition member 110. The transition member 110 may facilitate alignment of an end face 146 of the light pipe 84 and a fiber end face 148 of the fiber optic cabling 128 to allow transmission of the light 92, 94 between the light pipe 84 and the fiber optic cabling 128.

In certain embodiments, the end face 146 of the light pipe 84 and the fiber optic end face 148 may be in contact with one another. In other embodiments, an air gap 150 may separate the end face 146 and the fiber optic end face 148. The air gap 150 may facilitate uniform distribution of the light 92, 94 over a surface area of the transition member 110 before the light 92, 94 impinges onto the respective end face 146, 148. This may mitigate damage to the end face 146, 148 that may result from impingement of high-energy light (e.g., short wavelength light). For example, the thermographic phosphor 86 in the light pipe 84 may include materials such an yttrium aluminum garnet (YAG) crystal, lutetium aluminum garnet (LuAG) crystal, scandium aluminum garnet (ScAG) crystal, yttrium aluminum boron nitrogen garnet (YABNG) crystal, yttrium aluminium boron garnet (YABG) crystal, quartz crystal, sapphire crystal, or any other suitable crystal doped with a thermographic phosphor. By way of example, the crystal may be doped with rare earth elements such as neodymium (Nd), chromium (Cr), erbium (Er), ytterbium (Yb), cerium (Ce), dysprosium (Dy), thulium (Tm), or any other suitable thermographic phosphor and combinations thereof.

Each thermographic phosphor may require a certain light energy for luminescence that is different from another materially different thermographic phosphor. Similarly, each thermographic phosphor may output light energy that is different from the light energy of another materially different thermographic phosphor. In certain embodiments, the amount of energy emitted by the optical source 90 and/or the thermographic phosphor 86 may be high-energy light (e.g., short wavelength light). The intensity of the high-energy light may damage the end face 146, 148, which is where the light 92, 94 first impinges the light pipe 84 and the fiber optic cabling 128, respectively. The air gap 150 may uniformly distribute energy from the light 92, 94 over a surface area of the transition member 110, which may decrease the intensity at which the light 92, 94 impinges on the end face 146, 148. Therefore, damage to the light pipe 84 that may result from the energy associated with the light 92, 94 may be reduced compared to probe configurations that do not include the air gap 150. Additionally, the air gap 150 may allow the end faces 146, 148 of the light pipe 84 and the fiber optic cabling 128, respectively, to include angles, bevels, and/or optical lenses, which may mitigate reflection of the light 92, 94 between the light pipe 84 and the fiber optic cabling 128.

A portion of the fiber optic cabling 128 is enclosed within the tubing 120, which facilitates coupling the probe 80 to the optical source 90 and the detector 96. Additionally, the tubing 120 may be used to carry cooling air through the temperature sensor 20 to maintain the fiber optic cabling 128 at a temperature that meets the constraints of the mechanical properties of the fiber optic cabling 128. In the illustrated embodiment, the tubing 120 is inserted into a proximal end 154 of the transition member 110 and through at least a portion of a central passage 158 of the transition member 110. In certain embodiments, the tubing 120 may be threaded into the transition member 110. Threading the tubing 120 may facilitate decoupling the tubing 120 from the transition member 110, for example, during maintenance and/or repair of the probe 80. In other embodiments, the transition member 110 may be inserted into the tubing 120 such that the tubing 120 circumferentially 104 surrounds at least a portion of the proximal end 154 of the transition member 110. An adhesive may be used to adhere the tubing 120 to the transition member 110 to reinforce the coupling between the tubing 120 and the transition member 110. In certain embodiments, brazing and crimping could be used to couple the tubing 120 to the transition member 110.

As discussed above, the light pipe 84 is disposed within the sheath member 108 such that an air cladding (e.g., air gap) formed within the first annulus 138 of the sheath member 108 circumferentially 104 surrounds the light pipe 84. That is, the first outer wall 130 of the light pipe 84 is not in contact with the inner wall 132 of the sheath member 108. Accordingly, the probe 80 may include features that facilitate positioning and securing the light pipe 84 within the first annulus 138 such that at least a portion of the light pipe 84 (e.g., greater than approximately 90% of a total surface area of the light pipe 84) may be circumferentially 104 surrounded by air (e.g., air cladding). For example, the probe 80 may include radial supports 164 positioned at various locations along the longitudinal axis 100 of the probe 80 and extending radially 102 between the light pipe 84 and the sheath member 108. The location of the radial supports 164 may correspond to a position of the plurality of holes 116 on the sheath member 108. In certain embodiments, an adhesive (e.g., ceramic adhesive) may be injected into each hole of the plurality of holes 116 of the sheath member 108. Once cured, the adhesive binds to the outer wall 130 of the light pipe 84 and sheath sidewalls 168 of the sheath member 108, thereby forming the radial supports 164 and securing the light pipe 84 within the sheath member 108.

A first dimension 170 of the radial supports 164 may be controlled by a second dimension 172 of the plurality of holes 116. That is, the first dimension 170 of the radial supports 164 may be limited by the second dimension 172 of the respective hole of the plurality of holes 116. In other embodiments, an injection pressure of the adhesive may be used to control the first dimension 170 of the radial supports 164.

In certain embodiments, the radial supports 164 may include inserts (e.g., rods) manufactured from refractory materials and sized to fit within the plurality of holes 116. The inserts may be inserted into the plurality of holes 116 and adhered to the outer surface 130 of the light pipe 84 and the sheath sidewalls 168 of the sheath member 108 with the adhesive. The rods may be cylindrical, rectangular, prismatic, T-shaped, or any suitable geometry.

It may be desirable to minimize contact between the radial supports 164 and the light pipe 84. Therefore, each hole of the plurality of holes 116 may be sized and spaced apart such that each of the radial supports 164 may contact between approximately 0.5% and approximately 10% of a total surface area of the outer surface 130 of the light pipe 84. For example, FIG. 6 illustrates an embodiment of the sheath member 108 having each hole of the plurality of holes 116 spaced apart along both the longitudinal axis 100 and the circumferential axis 104 of the sheath member 108. In the illustrated embodiment, each hole of the plurality of holes 116 is spaced apart a distance 180 (e.g., measured from center to center of each hole) along the longitudinal axis 100 of the sheath member 108. Additionally, as illustrated in FIG. 7, each hole of the plurality of holes 116 is circumferentially 104 aligned and spaced apart from an adjacent hole of the plurality of holes 116 by an angle 190. As such, the radial supports 164 (see FIG. 5) may contact the light pipe 84 at various points along both the longitudinal axis 100 and the circumferential axis 104 of the light pipe 84 to reinforce and secure the light pipe 84 within the sheath member 108.

Returning to FIG. 6, the sheath member 108 may have a first longitudinal dimension 184 and a first outer dimension 186. While the first longitudinal dimension 184 of the sheath member 108 may be any suitable size, in certain embodiments, the first longitudinal dimension 184 of the sheath member 108 may be between approximately 5% and approximately 250% or more greater than a longitudinal dimension of the light pipe 84 (e.g., the second longitudinal length 210 shown in FIG. 8).

The first outer dimension 186 of the sheath member 108 may be sized to fit into the one or more channels 54 of the temperature manifold 50 (see FIG. 2). For example, the first outer dimension 186 may be between approximately 0.5% and approximately 5% less than an inner diameter of the one or more channels 54. In certain embodiments, the first outer dimension 186 may be between approximately 1 mm and approximately 5 mm. However, the first outer dimension 186 may be any other suitable size. In one embodiment, the first longitudinal dimension 184 and the first outer dimension 186 of the sheath member 108 are such that probe 80 has overall dimensions that may be approximately equal to dimensions of conventional thermocouple temperature sensors. As such, the probe 80 may be used to replace thermocouple temperature sensors for fluid temperature measurement applications. Additionally, the air cladding on the light pipe 84 may mitigate other processes that may cause noise or other delays (e.g., scattering).

As discussed above, the plurality of holes 116 are spaced apart along the longitudinal axis 100 of the sheath member 108. Therefore, in some embodiments, based on the first longitudinal dimension 184 of the sheath member 108, the distance 180 between each hole of the plurality of holes 116 along the longitudinal axis 100 may be between approximately 5% and approximately 50% of the first longitudinal dimension 184. For example, in certain embodiments, the distance 180 may be between approximately 6 millimeters (mm) and approximately 25 mm. As such, the radial supports 164 may contact between approximately 0.5% and approximately 10% of the total surface area of the outer surface 130 of the light pipe 84, and the air cladding on the light pipe 84 may circumferentially 104 surround between approximately 90% and approximately 99% of the light pipe 84. Consequently, the light 92, 94 may be transmitted through the light pipe 84 more efficiently, and signal strength may be improved compared to sensing elements that do not include air cladding.

In the illustrated embodiment, a sheath proximal end 192 may include a threaded outer surface 194 that may facilitate coupling the sheath member 108 to the transition member 110 (see FIG. 5). The sheath proximal end 192 may be inserted into the central passage 158 of the transition member 110 to secure the sheath member 108 to the transition member 110 via a threaded connection. For example, the sheath proximal end 192 may have a second outer diameter 196 that may be approximately equal to at least a portion of an inner diameter of the central passage 158 of the transition member 110 (to allow for an interference or friction fit connection). As such, the sheath proximal end 192 may be inserted into a portion of the central passage 158. The threaded outer surface 194 of the sheath member 108 may engage with complementary threads within the central passage 158 to secure the sheath member 108 to the transition member 110. In certain embodiments, the second outer diameter 196 may be less than the first outer diameter 186 of the sheath member 108. Therefore, the outer surface of the probe 80 may not have protruding surfaces along the longitudinal axis 100 that may interfere with insertion of the probe 80 into, for example, the respective channel of the plurality of channels 54 of the temperature manifold 50.

In certain embodiments, a proximal tip 198 of the sheath member 108 may be tapered. The tapered proximal tip 198 may facilitate insertion of the sheath proximal end 192 into the central passage 158 of the transition member 110. The first inner surface 142 of the central passage 158 may have a complementary tapered shape that accommodates the tapered proximal tip 198. This arrangement may facilitate alignment between the end face 146 of the light pipe 84 and the fiber end face 148 of the fiber optic cabling 128.

As discussed above, the sheath member 108 encapsulates the light pipe 84 and the thermographic phosphor 86 (e.g., sensing element) used to measure the temperature of the exhaust gas 24 or any other suitable fluid. Accordingly, the light pipe 84 is dimensioned to fit within the sheath member 108. FIG. 8 illustrates an embodiment of the light pipe 84 that may be encapsulated within the sheath member 108.

The light pipe 84 includes a first end 200 having the end face 146 and a second end 204 that is opposite the first end 200. The light pipe 84 includes a first portion 206 and a second portion 208 that form a second longitudinal length 210 of the light pipe 84. The first portion 206 of the light pipe 84 extends from the end face 146 to an interface point 209 between the first portion 206 and the second portion 208. In one embodiment, the second portion 208 may be between approximately 1% and approximately 50% of the second longitudinal length 210 of the light pipe 84. However, the second portion 208 may be any other suitable dimension.

The first portion 206 may be manufactured from non-doped crystals such as yttrium aluminum garnet (YAG) crystals, sapphire crystals, quartz crystals, or any other suitable crystal that may support the thermographic phosphor 86. The second portion 208 may be positioned at the second end 204 and includes the thermographic phosphor 86. The thermographic phosphor 86 includes doped crystals such as rare earth- or transition metal-doped YAG, rare earth- or transition metal-doped quartz, or rare earth- or transition metal-doped sapphire crystals. Accordingly, the first portion 206 is the base of the light pipe 84 and the second portion 208 is the dopant. In one embodiment, the first portion 206 and the second portion 208 of the light pipe 84 are monolithic. That is, the non-doped crystal and the doped crystal are bonded together during crystal growth to form a single integrated structure. In another embodiment, the first portion 206 and the second portion 208 are discrete (e.g., non-bonded, unattached) portions that are in contact with one another within the sheath member 108. For example, each respective end face of the first portion 206 (e.g., non-doped crystal) and the second portion 208 (e.g., doped crystal) are in contact with one another at the interface point 209. However, in one embodiment, the first portion 206 and the second portion 208 are separated from one another such that the portions 206, 208 are not in contact with one another. In certain embodiments, the thermographic phosphor 86 is a powder that may be disposed on an end face (e.g., end face adjacent to the interface point 209) of the first portion 206. The thermographic phosphor powder may be mixed with binders or other suitable materials to consolidate powder particulates and facilitate deposition on the end face of the first portion 206. By way of example, the thermographic phosphor powder may be YABNG:Dy, YAB-G:Dy, or any other suitable thermographic phosphor.

As discussed above, the light pipe 84 is housed within the sheath member 108. Therefore, the second longitudinal length 210 of the light pipe 84 may be approximately equal to or less than the first longitudinal length 184 of the sheath member 108. For example, in one embodiment, the second longitudinal length 210 may be such that the first end 200 of the light pipe 84 co-terminates (e.g., is flush) with the proximal end 192 of the sheath member 108. In another embodiment, the first end 200 of the light pipe 84 is below the proximal end 192 of the sheath member 108. However, in other embodiments, the second longitudinal length 210 is greater than the first longitudinal length 184 such that the first end 200 of the light pipe extends beyond the proximal end 192 of the sheath member 108. In this particular embodiment, the first end 200 of the light pipe 84 may be inserted into the central passage 158 of the transition member 110.

FIG. 9 is a cross-sectional view of an embodiment of the transition member 110 that may be used with the probe 80. As discussed above, the central passage 158 of the transition member 110 may receive an end of the sheath member 108 (e.g., the proximal end 192) and the tubing 120 to align the end face 146 of the light pipe 84 and the fiber optic end face 148. The central passage 158 includes a first section 216, a second section 218, and a third section 220. The first section 216 of the central passage 158 longitudinally 100 extends away from the proximal end 154 of the transition member 110 to the second section 218. The second section 218 longitudinally 100 extends away from the first section 216 to the third section 220. That is, the second section 218 is positioned between the first and the third sections 216, 220. The third section 220 longitudinally 100 extends away from the second section 218 to a transition distal end 226 of the transition member 110.

The central passage 158 may have a variable diameter to accommodate various components of the probe 80. For example, the first section 216 has a first diameter 230 sized to receive the tubing 120, the second section 218 has a second diameter 232 sized to receive the fiber optic cabling 128, and the third section 220 has a third diameter 236 sized to receive the proximal end 192 of the sheath member 108 (see FIG. 7). In certain embodiments, the central passage 158 may be two separate passages sized to receive a dedicated fiber optic cable for sending the light 92 to the light pipe 84 or a dedicated fiber optic cable for receiving the light 94 emitted by the thermographic phosphor 86. In the illustrated embodiment, the first section 216 includes a threaded inner surface 238 that engages with a complementary threaded outer surface of the tubing 120 to secure the tubing 120 to the transition member 110. The threaded connection between the transition member 110 and the tubing 120 may facilitate a secure connection while also allowing decoupling of the tubing 120 from the transition member 110 to replace sensor components (e.g., the tubing 120 and/or the fiber optic cabling 124). However, in other embodiments, the first section 216 may not include the threaded inner surface 238. Rather, the inner surface of the first section 216 may be smooth. In this particular embodiment, the tubing 120 may be secured within the first section 216 of the transition member 110 via an interference fit (e.g., via ribs on the outer surface of the tubing 120) and/or with an adhesive.

In certain embodiments, at least a portion of the first diameter 230 of the first section 216 may gradually decrease. For example, in the illustrated embodiment, the first diameter 230 decreases toward the second section 218 such that the first section 216 tapers toward the second section 218. However, in other embodiments, the first diameter 230 of the first section 216 may be constant.

The second diameter 232 of the second section 216 may be smaller than both the first and third diameters 230, 236 of the first and second sections 216, 220, respectively. A transition between the second section 218 and the first and/or third sections 216, 220, respectively, may be gradual (e.g., as in the first diameter 230 and/or the third diameter 236 gradually decreases toward the second section 218) or may be sudden.

In certain embodiments, the second diameter 232 of the second section 216 may decrease toward the third section 220 such that a first step 242 forms within the second section 218. As discussed above, the air gap 150 separates the end face 146 of the light pipe 84 and the fiber optic end face 148 of the fiber optic cabling 128 (see FIG. 5). The first step 242 may block the fiber optic cabling 128 from advancing further down the second section 218 of the central passage 158 toward the third section 220, thereby forming the air gap 150 between the end face 146 of the light pipe 84 and the fiber optic end face 148 of the fiber optic cabling 128.

As discussed above, the second diameter 232 is smaller than the third diameter 236. Accordingly, the central passage 158 may have a second step 246 (e.g., abutment surface) formed at a transition between the third section 220 and the second section 218. The second step 246 blocks the proximal end 192 of the sheath member 108 from advancing into the second section 218. For example, the sheath member 108 may be inserted into the third section 220 of the transition member 110. When properly positioned, the sheath end face 140 of the sheath member 108 abuts the first inner surface 142 associated with the second step 246 of the transition member 110. Therefore, the air gap 150 in the second section 218 is positioned between the first and second steps 242, 246 in the central passage 158 of the transition member 110.

In certain embodiments, a second inner surface 250 of the third section 220 may be smooth (e.g., missing ridges or protrusions introduced during manufacturing), and the coupling between the sheath member 108 and the transition member 110 may be via an interference fit connection. An adhesive may also be applied to the proximal end 192 of the sheath member 108 and/or the second inner surface 250 of the third section 220 to secure the sheath member 108 to the transition member 110 to reinforce the connection. In other embodiments, the second inner surface 250 of the third section 220 may be threaded. For example, as illustrated in FIG. 10, the third section 220 includes a second threaded inner surface 254. The second threaded inner surface 254 may facilitate coupling between the transition member 110 and the complementary threaded outer surface 194 at the proximal end 192 of the sheath member 108 (e.g., see FIG. 6). The threaded connection between the sheath member 108 and the transition member 110 may facilitate a secure connection while also allowing decoupling of the sheath member 108 and the transition member 110. In certain embodiments, the probe 80 may be part of a kit that includes multiple sheath members 108, and/or different thermographic phosphors 86 with different temperature thresholds. An operator of the probe 80 may select the sheath member 108 having a particular one of the thermographic phosphors 86 appropriate (e.g., most suitable) for the temperature measurement application. The treaded connection between the sheath member 108 and the transition member 110 may facilitate interchanging between multiple sheath members 108.

Figure 11:
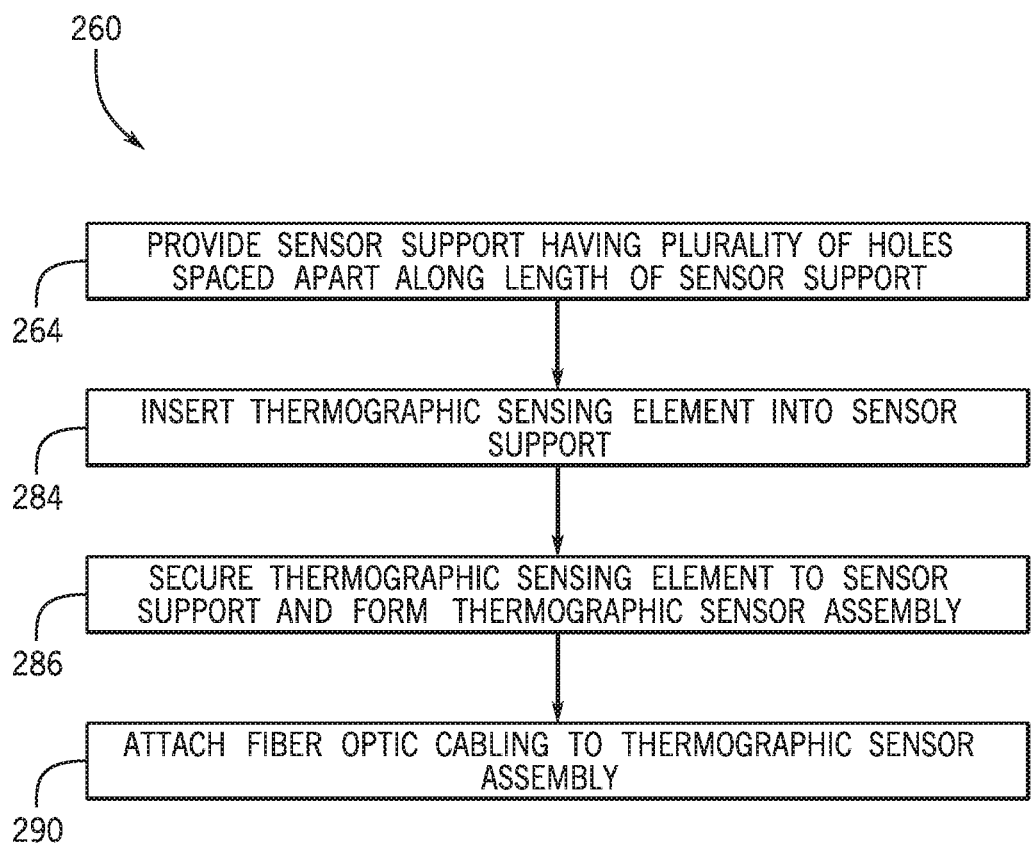
FIG. 11 is a process-flow diagram of a method for manufacturing a thermographic temperature probe having a sensing element disposed within a housing and having air cladding about a portion of a circumferential axis of the sensing element, in accordance with an embodiment of the present disclosure.

Present embodiments also include techniques that may be used to manufacture the probe 80. One approach is depicted in FIG. 11, which illustrates an embodiment of a method 260 to manufacture the probe 80 of the one or more temperature sensors 20 that may be used with the gas turbine system 10 illustrated in FIG. 1 or any other suitable system to measure a temperature of fluids (e.g., the exhaust gas 24). In addition, to facilitate discussion of aspects of the method 260, reference is made to structures in FIGS. 12-16, which may correspond to certain of the acts of the method 260.

The method 260 includes providing a sensor support (e.g., the sheath member 108) having a plurality of holes (e.g., the plurality of holes 116) spaced apart along a length of the sensor support (block 264). For example, FIG. 12 is a cross-sectional view of the sheath member 108. As illustrated, the sheath member 108 includes a central bore 268 longitudinally 100 extending between a first support end 270 and a second support end 272. The first inner diameter 129 of the central bore 268 may be approximately between approximately 1% and 10% larger than the outer diameter 127 of the light pipe 84.

The plurality of holes 116 are spaced apart and aligned along the longitudinal axis 100 and circumferential axis 104 of the sheath member 108. Each hole of the plurality of holes 116 radially 102 extends through a thickness 274 of a support wall 276 of the sheath member 108 from a support outer surface 278 to the inner surface 132. The plurality of holes 116 may be formed via any suitable technique such as drilling, laser cutting, additive manufacturing, or 3D printing. Each hole of the plurality of holes 116 may have an inner diameter 280 of between approximately 0.5 mm and approximately 2.5 mm.

Returning to the method 260 of FIG. 11, the method also includes inserting a thermographic light pipe (e.g., the light pipe 84) into the sensor support (block 284) and securing the thermographic light pipe to the sensor support (block 286) to generate a thermographic sensing assembly. For example, FIG. 13 is a cross-section of a thermographic sensing assembly 288 resulting from the acts of blocks 284 and 286. The light pipe 84 may be inserted into the central bore 268 through the first support end 270 and pushed toward the second support end 272. In certain embodiments, the second support end 272 is sealed. That is, the central bore 268 of the sheath member 108 is closed at the second support end 272. In other embodiments, the second support end 272 is open. In the illustrated embodiment, the second end 204 of the light pipe 84 is flush with the second support end 272. However, in other embodiments, the second support end 272 may extend past the second end 204 of the light pipe 84.

Following placement of the light pipe 84 within the central bore 268 of the sheath member 108, the light pipe 84 is secured to the sheath member 108 with the radial supports 164 to form the thermographic sensing assembly 288. For example, an adhesive (e.g., a cement adhesive) may be injected into each hole of the plurality of holes 116. The adhesive binds to a portion of the outer wall 130 of the light pipe 84 and to the sidewalls 168 within the plurality of holes 116 of the sheath member 108, thereby securing the light pipe 84 to the sheath member 108. In other embodiments, rods made of refractory material may be inserted into each hole of the plurality of holes 116 and secured to the outer wall 130 of the light pipe 84 and the sidewalls 168 of the sheath member 108 with the adhesive. By using the radial supports 164 at discrete locations along the longitudinal axis 100 and the circumferential axis 104 of the sheath member 108, the light pipe 84 may be secured within the sheath member 108 such that the light pipe 84 may have an air cladding about the circumferential axis 104. The air cladding (e.g., air gap) results from air within the first annulus 138 between the inner wall 132 of the sheath member 108 and the outer wall 130 of the light pipe 84. In this way, the light pipe 84 may appear to be floating within the sheath member 108.

Figure 14:
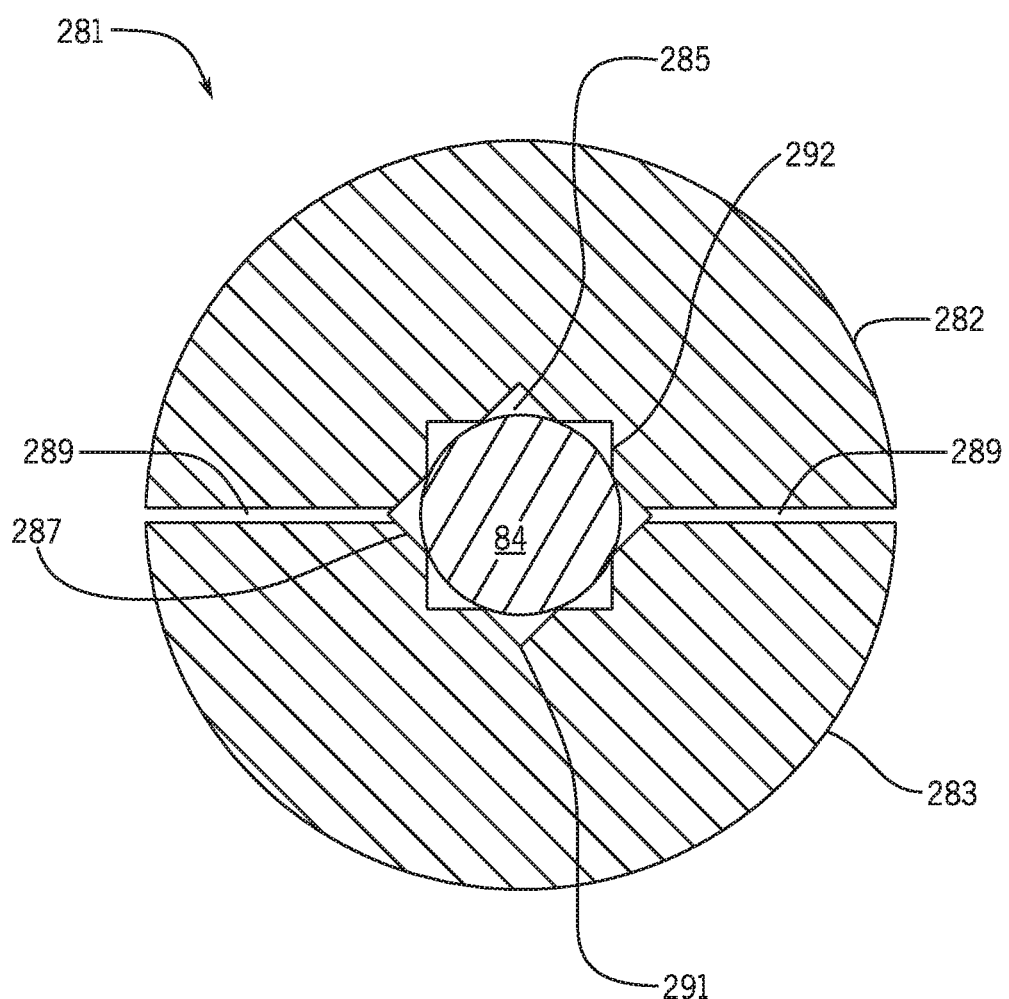
FIG. 14 is a cross-sectional view of a sensor assembly having a clamshell sheath member and a thermographic light pipe secured to the clamshell sheath member, in accordance with an embodiment of the present disclosure.

In certain embodiments, the sheath member 108 may be similar to a clamshell. In this particular embodiment, the sheath member may include two half portions that when combined (e.g., coupled along the first longitudinal dimension 184) form a sheath member. For example, FIG. 14 is a cross-sectional view of a clamshell sheath member 281 having a first half portion 282, a second half portion 283, and a shaped central passage 285 that supports the light pipe 84. In certain embodiments, the first half portion 282 is a separate piece from the second half portion 283. In other embodiments, the portions 282, 283 may be held together by a hinge positioned along the longitudinal dimension 184 on one side (e.g., outer wall) of the clamshell sheath member 281. Each half portion 282, 283 may include a v-groove 287 that extends along a longitudinal length of the clamshell sheath member 281 (e.g., the first longitudinal dimension 184). The v-groove 287 of each half portion 282, 283 defines the shaped central passage 285 when the half portions 282, 283 are coupled to one another via abutments surfaces 289. Due, in part, to the v-shaped geometry of the v-groove 287, the shaped central passage 285 may have a square-like geometry. Therefore, when the light pipe 84 is disposed within the shaped central passage 285, apexes 291 of the shaped central passage 285 are not in contact with the light pipe 84, thereby forming the air gap 150. In certain embodiments, the v-groove may include one or more recesses 292 extending along the longitudinal length of one or both half portion 282, 283. Similar to the apexes 291, the one or more recesses 292 may form the air gap 150 such that certain portions of an inner surface the v-groove 287 are not in contact with the light pipe 84. While in the illustrated embodiment, the one or more recesses 292 have v-shape, the one or more recesses 287 may have any other suitable geometric shape.

Returning again to the method 260 of FIG. 11, upon securing the light pipe 84 within the central bore 268 of the sheath member 108 to generate the thermographic sensing assembly 288, the method 260 includes attaching the fiber optic cabling 128 to the thermographic sensing assembly 288 (block 290). This may be accomplished by attaching the fiber optic cabling 128 directly to the thermographic sensing assembly 288, the transition member 110, or a sensor sleeve positioned over the thermographic sensing assembly 288. For example, FIG. 15 illustrates an embodiment of the thermographic sensing assembly 288 having the fiber optic end face 148 of the fiber optic cabling 128 attached to the end face 146 of the light pipe 84. In this particular embodiment, the end faces 146, 148 are in contact with one another. The fiber optic cabling 128 may be attached to the thermographic sensing assembly 288 with fasteners, adhesives, or any other suitable attachment technique. For example, in one embodiment, a joint 289 may be positioned over the respective end faces 146, 148 of the light pipe 84 and the fiber optic cabling 128 to attach the fiber optic cabling 128 to the thermographic sensor assembly 288. The joint 289 may have an inner diameter sized to fit over both the light pipe 84 and the fiber optic cabling 128. That is, an inner diameter of an end portion of the of the joint 289 may be approximately equal to the outer diameter 127 of the light pipe 84 and an inner diameter of another end portion of the joint 289 may be approximately equal to an outer diameter of the fiber optic cabling 128.

In certain embodiments, the transition member 110 may be used to facilitate attachment of the fiber optic cabling 128 to the thermographic sensor assembly 288. For example, as illustrated in FIG. 5, the fiber optic cabling 128 may be disposed within the transition member 110. Following insertion of the fiber optic cabling 128 into the transition member 110, the transition member 110 may be coupled to the thermographic sensing assembly 288 (e.g., via a threaded or interference fit connection). The transition member 110 may also facilitate separating the end faces 146, 148 of the light pipe 84 and the fiber optic cabling 128, respectively, such that the end faces 146, 148 are not in contact with one another. For example, as discussed above, the transition member 110 may have features (e.g., the steps 242, 246) that block advancement of the light pipe 84 and the fiber optic cabling 128 through at least a portion of the central passage 158 of the transition member 110. Consequently, the air gap 150 may separate the end faces 146, 148 of the light pipe 84 and the fiber optic cabling 128, respectively. In one embodiment, the tubing 120 may be attached to the transition member 110 before or after coupling of the thermographic sensor assembly 288 and the transition member 110 to complete assembly of the probe 80.

In other embodiments, the thermographic sensor assembly 288 may be inserted into a sleeve that encapsulates the thermographic sensor assembly 288, and the fiber optic cabling 128 may be attached to the thermographic sensor assembly 288 via the sleeve. For example, FIG. 16 illustrates a portion of the probe 80 having the thermographic sensor assembly 288 inserted into a sleeve 296 that circumferentially 104 surrounds the sheath member 108 and the light pipe 84 along the longitudinal axis 100. Similar to the sheath member 108, the sleeve 296 may be manufactured from refractory materials (e.g., ceramics) suitable for high temperature environments. The sleeve 296 includes a first sleeve end 298 and a sleeve inner diameter 300 sized to fit the sheath member 108. The sleeve inner diameter 300 may be between approximately 1% and approximately 15% larger than the first outer dimension 186 of the sheath member 108. During assembly of the probe 80, the thermographic sensor assembly 288 may be inserted into the first sleeve end 298. Once the thermographic sensor assembly 288 is positioned within the sleeve 296, a second annulus 302 between the thermographic sensor assembly 288 and the sleeve 296 may be filled with an adhesive 303 (e.g., ceramic adhesive) to secure the thermographic sensor assembly 288 to the sleeve 296. The fiber optic cabling 128 may be inserted into a channel 305 positioned at a second end 304 of the sleeve 296 and coupled to the light pipe 84 of the thermographic sensor assembly 288, for example, with an adhesive.

The sleeve 296 may be secured onto the transition member 110 in a manner similar to the sheath member 108. For example, the sleeve 296 may be secured to the transition member 110 via a threaded connection and/or an interference fit connection that may or may not use adhesives. Therefore, rather than the sheath member 108 being secured to the transition member 110, the sleeve 296 is secured to the transition member 110 to form the probe 80. For example, a second sleeve end 304 may have a second sleeve outer diameter 306 that is smaller than the first sleeve outer diameter 296. The second sleeve outer diameter 306 may be approximately equal to the third outer diameter 236 of the third section 220 of the central passage 158 in the transition member 110. Accordingly, the second sleeve end 304 may be coupled to the transition member 110 in a manner similar to the sheath member 108. Before or after coupling of the second sleeve end 304 and the transition member 110, the tubing 120 may be attached to the transition member 110 to complete assembly of the probe 80.

In certain embodiments, the probe 80 may not include the transition member 110. As such, the tube 120 may be coupled to the second sleeve end 304. The tube 120 may be secured onto the sleeve 296 with an adhesive and or by crimping or swaging the tube 120 to the second sleeve end 304.

As described above, temperature sensors having a thermographic phosphor (e.g., the probe 80) may be used to directly measure a temperature of a fluid (e.g., an exhaust gas) in high temperature environments (e.g., in a combustor of a gas turbine engine) that may be unsuitable for thermocouple temperature sensors. The probe 80 may be manufactured from refractory materials (e.g., ceramic materials) that may tolerate high temperatures generally seen in, for example, gas turbine systems and gasification systems, among others. The probe 80 includes the thermographic phosphor 86 on an end of the light pipe 84 that absorbs radiation (e.g., light 92) emitted by a radiation source (e.g., the optical source 90), and in response luminesce (e.g., emit the light 94). The luminescence lifetime of the thermographic phosphor 86 is temperature dependent. Therefore, the intensity of the light 94 may be measured over time to determine the temperature of the fluid of interest (e.g., the exhaust gas 24). The temperature sensors disclosed herein may replace and/or supplement the use of thermocouples, for example, in temperature environments that may be outside a temperature threshold for thermocouple temperature sensors. Replacing the use of thermocouple temperature sensors for measuring temperatures in high temperature systems such as gas turbine system and gasification systems may decrease the overall costs associated with replacing thermocouples that have been exposed to temperatures above the their temperature limits.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising
a thermographic temperature sensor configured to measure a temperature of a fluid, wherein the thermographic temperature sensor comprises a probe, an optical source coupled to the probe, and a detector coupled to the probe;
a housing of the probe; and
a light pipe of the probe disposed within the housing and comprising a thermographic phosphor configured to phosphoresce in response to absorbing light from the optical source, wherein the phosphorescence by the thermographic phosphor is representative of a temperature of the fluid within a flow path of the fluid, and wherein the detector is configured to detect the phosphorescence by the thermographic phosphor.

2. The system of claim 1, comprising a control system having memory circuitry storing one or more sets of instructions executable by one or more processors of the control system to determine the temperature of the fluid based on a change in intensity of the phosphorescence over time.

3. The system of claim 1, wherein the light pipe is spaced apart from an inner surface of the housing such that a total surface area of the light pipe is not in contact with the inner surface of the housing.

4. The system of claim 1, wherein the sensor assembly comprises air cladding between an inner surface of the housing and an outer surface of the sensing element, and wherein the air cladding circumferentially surrounds at least a portion of the sensing element.

5. The system of claim 1, wherein the housing comprises a central bore extending between a proximal end and a distal end, wherein the light pipe is nested within the central bore, and wherein the thermographic phosphor is adjacent to the distal end.

6. The system of claim 1, wherein the light pipe is a crystal comprising yttrium aluminum garnet (YAG), yttrium aluminum boron nitrogen garnet (YABNG), yttrium aluminum boron garnet (YABG), lutetium aluminum garnet (LuAG), scandium aluminum garnet (ScAG), sapphire, or quartz.

7. The system of claim 6, wherein a portion of the crystal is doped with the thermographic phosphor, and wherein the thermographic phosphor comprises any of a rare-earth element or a transition metal.

8. The system of claim 1, comprising a gas turbine engine comprising a combustor configured to generate the fluid, wherein the fluid comprises an exhaust gas.

9. The system of claim 8, comprising a manifold disposed within a flow path of the exhaust gas, wherein the manifold comprises a plurality of channels, and wherein each channel of the plurality of channels is configured to receive and direct the probe into the flow path of the exhaust gas.

10. A system, comprising:
a gas turbine engine comprising a combustor configured to receive a fuel and air to generate an exhaust gas;
a thermographic temperature sensor comprising a sensor assembly disposed within a flow path of the exhaust gas, wherein the sensor assembly comprises:
a housing configured to contact the exhaust gas; and
a light pipe enclosed within the housing and comprising a thermographic phosphor configured to phosphoresce in response to absorbing light, and wherein the phosphorescence by the thermographic phosphor is representative of a temperature of the exhaust gas within the flow path.

11. The system of claim 10, wherein the thermographic temperature sensor comprises:
an optical source configured to emit the light, wherein the optical source is coupled to the sensing element; and
a detector coupled to the light pipe and configured to detect the phosphorescence.

12. The system of claim 10, comprising a manifold disposed within the flow path of the exhaust gas, wherein the manifold comprises a plurality of channels, wherein a channel of the plurality of channels is configured to receive and direct the sensor assembly into the flow path of the exhaust gas.

13. The system of claim 10, wherein the housing of the sensor assembly comprises a sheath member having a central bore extending from a first sheath end to a second sheath end, and a transition member having a central passage extending between a first transition end and a second transition end, wherein the first sheath end is disposed within the second transition end.

14. The system of claim 13, wherein the light pipe is disposed within the central bore of the sheath member such that a terminating end of the light pipe is adjacent to the second sheath end of the sheath member, and wherein the thermographic phosphor is disposed on the terminating end of the sensing element.

15. The system of claim 10, wherein the sensor assembly comprises air cladding between an outer surface of the light pipe and an inner surface of the housing, wherein the air cladding circumferentially surrounds at least a portion of the sensing element.

16. The system of claim 10, comprising a control system having memory circuitry storing one or more sets of instructions executable by one or more processors of the control system to determine the temperature of the exhaust gas based on a change in intensity of the phosphorescence over time.

17. The system of claim 1, wherein the light pipe is a crystal comprising yttrium aluminum garnet (YAG), lutetium aluminum garnet (LuAG), scandium aluminum garnet (ScAG), sapphire, or quartz, wherein a portion of the crystal is doped with the thermographic phosphor, and wherein the thermographic phosphor comprises any of a rare-earth element or a transition metal.

18. A method of measuring a temperature of a fluid, comprising:
directing light from an optical source to a probe configured to contact the fluid and having a housing and a light pipe disposed within the housing;
generating phosphorescence from a thermographic phosphor of the light pipe in response to absorbing the light;
directing the phosphorescence from the light pipe to a detector coupled to the probe; and
determining the temperature of the fluid based on a change in intensity of the phosphorescence over time.

19. The method of claim 18, wherein a total surface area of the light pipe is not in contact with an inner surface of the housing.

20. The method of claim 19, wherein the probe comprises air cladding between the light pipe and the inner surface of the housing, wherein the air cladding circumferentially surrounds at least a portion of the total surface area of the sensing element.

* * * * *